US009573567B2

(12) United States Patent
Kirkbride et al.

(10) Patent No.: US 9,573,567 B2
(45) Date of Patent: Feb. 21, 2017

(54) AIRCRAFT LANDING GEAR COOLING SYSTEM

(71) Applicant: The Boeing Company, Chicago, IL (US)

(72) Inventors: David W. Kirkbride, Jupiter, FL (US); Darrell S. Jolliffe, Everett, WA (US)

(73) Assignee: The Boeing Company, Chicago, IL (US)

( * ) Notice: Subject to any disclaimer, the term of this patent is extended or adjusted under 35 U.S.C. 154(b) by 455 days.

(21) Appl. No.: 13/779,982

(22) Filed: Feb. 28, 2013

(65) Prior Publication Data

US 2014/0239121 A1     Aug. 28, 2014

(51) Int. Cl.
*B64C 25/42*     (2006.01)
*B60T 5/00*      (2006.01)
*F16D 65/847*    (2006.01)
*B60R 99/00*     (2009.01)

(52) U.S. Cl.
CPC ............ *B60R 99/00* (2013.01); *B60T 5/00* (2013.01); *B64C 25/42* (2013.01); *F16D 65/847* (2013.01); *Y10T 137/0318* (2015.04); *Y10T 137/6855* (2015.04)

(58) Field of Classification Search
CPC ...... B64C 25/42; F16D 65/847; F16D 65/807; F16D 65/827
USPC ........ 244/110 A, 103 R, 111; 188/264, 71.6, 188/218; 301/6.3
See application file for complete search history.

(56) References Cited

U.S. PATENT DOCUMENTS

| 2,580,001 | A  | * | 12/1951 | Butler ................ 188/264 R |
| 3,251,437 | A  | * | 5/1966 | Moyer et al. .......... 188/264 AA |
| 3,301,357 | A  | * | 1/1967 | Cussons et al. ........ 188/264 R |
| 3,664,467 | A  | * | 5/1972 | Lucien et al. ........... 188/71.6 |
| 3,734,247 | A  | * | 5/1973 | Buckley ................ 188/264 A |
| 4,592,452 | A  | * | 6/1986 | Merle ................ 188/264 AA |
| 4,620,616 | A  | * | 11/1986 | Martin ................. 188/71.6 |
| 6,315,091 | B1 | * | 11/2001 | Nilsen et al. .......... 188/264 A |
| 6,857,510 | B2 | * | 2/2005 | Schneider et al. ....... 188/264 A |
| 7,963,376 | B2 | * | 6/2011 | Gelb .................. 188/264 AA |
| 8,333,438 | B2 | * | 12/2012 | Caule ................... 301/6.3 |

FOREIGN PATENT DOCUMENTS

| DE | WO 2013123993 A1 | * | 8/2013 | ........... B64C 25/405 |
| FR | WO9747520 A1 | * | 6/1997 | ............. B64C 25/40 |
| WO | 8204108 | | 11/1982 | |

OTHER PUBLICATIONS

Machine translation of WO1997047520A1 from Google Patents, <https://www.google.com/patents/WO1997047520A1?cl=en &dq=WO1997047520A1&hl=en&sa=X &ei=2VwiVZbONYODsAXv7YC4Bg&ved=0CB0Q6AEwAA>.*

(Continued)

*Primary Examiner* — Christopher P Ellis
*Assistant Examiner* — Michael Wang
(74) *Attorney, Agent, or Firm* — Kunzler Law Group, PC

(57) ABSTRACT

According to one embodiment, an apparatus for cooling at least one landing gear brake of an aircraft in flight is described. The apparatus includes an air handling assembly that is coupled to the aircraft. The air handling assembly includes at least one air inlet port. The apparatus also includes an air delivery assembly that is in air receiving communication with the air handling assembly. The air delivery assembly includes at least one nozzle that is configured to direct air into a first space adjacent a first side of the landing gear brake to create an air pressure differential across the landing gear brake.

26 Claims, 6 Drawing Sheets

(56) References Cited

OTHER PUBLICATIONS

M. P. Dyko et al., Fundamental Issues and Recent Advancements in Analysis of Aircraft Brake Natural Convective Cooling, Transactions of the ASME, Nov. 1998, pp. 840-857, vol. 120.

SKYbrary Wiki, Brakes http://www.skybrary.aero/index.php/Brakes, Nov. 20, 2012.

Getline, Putting the Brakes on Overheating, USA Today, http://usatoday30.usatoday.com/travel/columnist/getline/2005-09-05-ask-the-captain_x.htm, Sep. 5, 2005.

European Search Report Application No. EP14153604 dated Jun. 20, 2014.

Office Action for Mexican Patent Application MX/a/2013/013684 dated Sep. 21, 2015.

Office Action for Canadian Patent Application No. 2,833,892 dated Mar. 18, 2015.

Office Action for European Patent Application No. 14153604.5 dated Sep. 12, 2016.

\* cited by examiner

AIRCRAFT LANDING GEAR COOLING SYSTEM

FIELD

This disclosure relates to landing gear of an aircraft, and more particularly to cooling the brakes of landing gear of an aircraft during flight.

BACKGROUND

Commercial aviation regulations govern many aviation activities associated with commercial aircraft transportation. Some of these regulations directly and indirectly place restrictions and limits on commercial aircraft brake design and operation by specifying the braking power capacity and margins necessary to meet safety and emergency conditions. Braking power capacity is the ability of aircraft brakes to absorb kinetic energy generated in slowing or stopping aircraft movement. Aircraft brakes absorb the kinetic energy by converting the kinetic energy of the aircraft into thermal energy by raising the thermal mass temperature of the brakes. The brakes in turn transfer this thermal energy to the surrounding environment through thermal heat transfer mechanisms, which include conduction, convection, and radiation. These heat transfer mechanisms are dependent on mass, temperature and time. The thermal mass temperature of the brakes at any given time is a measure of the thermal energy stored in the brakes at the given time. The capacity of the brakes to absorb additional kinetic energy is determined by the difference in the thermal mass temperature at the given time subtracted from a predetermined maximum thermal mass temperature of the brakes. Therefore, the frequency and magnitude of kinetic energy absorbed by the brakes is dependent on the time it takes for the brakes to cool. Based on the foregoing, the thermal mass temperature of the brakes prior to a braking action determines the thermal mass temperature of the brakes at the conclusion of the braking action. For this reason, the brake cooling rate directly affects the utilization of the braking capacity of the brakes.

In addition to rules and regulations pertaining to braking power capacity, there are other aircraft configuration and system requirements that drive, and are driven by, the brake temperature, such as wheel fuse plug melt temperature and wheel well material temperature limits. These aircraft configuration and system requirements, as well as the rules and regulations, ensure that the temperature of an aircraft brake, and its associated components, remains below a maximum allowable temperature threshold during certain operating conditions or flight schedules. For example, the temperature of the brakes of an aircraft cannot exceed a threshold temperature during or following a preset number (e.g., four) of short distance flights, which are associated with relatively rapid takeoffs and landings. According to another regulation, the temperature of the brakes of commercial aircraft must be below some other threshold temperature before the aircraft is allowed to depart from a gate for takeoff.

Such rules, regulations, and requirements present challenges for some aircraft and brake types, as well as achieving certain flight schedules. The brakes of an aircraft generate a substantial amount of heat via the absorption of kinetic energy associated with slowing down an aircraft upon landing. For example, aircraft brakes on certain commercial aircraft may reach extremely high temperatures (e.g., 900° F.-1,100° F.) during landing. As soon as an aircraft has slowed down to a taxiing speed after landing, the brakes immediately begin to cool. However, the rate of cool down can be slow and often is inhibited by frequent braking during the taxi phase, which may raise the temperature of the brakes above the original landing temperature. While stationary at the gate, the cool down rate of the brakes typically is extremely low. Natural convective cooling may also take place during takeoffs and flight. However, like the convective heat transfer from the brakes during taxiing and at the gate, the convective heat transfer rate from the brakes during takeoff and flight is relatively low. In view of the high temperatures reached to slow the aircraft down during landing, and the relatively slow rate of heat transfer by natural convective cooling on the ground or in flight, it may be difficult to meet the maximum allowed brake temperature without undesired consequences in some cases. For example, an aircraft may not be in the air or on the ground long enough between landings to meet the repetitive-short flight regulation. Likewise, the gate departure regulation often results in aircraft departure delays as personnel must wait until the temperature of the brakes drop below the regulated threshold, which may cause airlines to miss desired gate turnaround times and associated flight frequency quotas.

Desirably, to meet the brake temperature limits and regulations while avoiding undesired consequences, some aircraft and aircraft component manufacturers, as well as operators, have recognized the need to improve cooling of the brakes. However, conventional methods and techniques employed to improve cooling often fail to adequately cool the brakes fast enough to either meet the brake temperature regulations or desired objectives, and often require the addition of ancillary power systems and other components.

For example, operators may remove a seal between a landing gear door and the body of an aircraft to allow external air to passively flow into the landing gear cavity during flight. Although the flow of air through the landing gear cavity may increase the convective cooling of the brakes, the rate of heat transfer still may not be high enough to sufficiently cool the brakes.

Other techniques involve the use of an electrically-powered fan that generates an artificial flow of air across the brakes during flight. Notwithstanding the ability of such active cooling techniques to lower the temperature of the brakes, these active temperature control techniques require additional electrical systems and power consumption in order to reduce brake temperatures. Not only do active cooling systems introduce reliability concerns commonly associated with electrical components and controls, but active cooling systems require and consume large amounts of power for operation, which can lead to substantial costs over time.

Some aircraft manufacturers and operators use techniques to reduce the temperature of the brakes reached during landing to obviate the need for auxiliary brake cooling. For example, increasing the mechanical braking capacity of the brakes tends to reduce maximum temperature reached during landing. However, increasing the mechanical braking capacity of the brakes also brings some undesired consequences, such as increased weight, cost, and complexity. Operators have also employed thrust reversing techniques or increased existing reverser settings on landing to decrease the maximum temperature of the brakes reached during landing. Although such techniques may result in a decrease in the brake heat loads (e.g., maximum temperature of the brakes), the decrease may not be sufficient to meet brake temperature regulations and/or avoid undesired consequences, such as the inability to meet faster, more frequent flight schedules, as well as placing additional stresses on propulsion systems and aircraft structures. In some instances, thrust reversing degrades the stopping capability of the aircraft by unweighting the landing gear, which results in increased stopping distance and places an even greater burden on the braking capacity.

In addition to concerns associated with meeting commercial aviation regulations, high aircraft brake temperatures may also cause undesirable temperature increases in components near the aircraft brakes when the brakes are stored after takeoff. Some aircraft materials, such as composite materials, may not tolerate extreme temperature increases due to radiated heat transfer from the stored brakes to the materials. To reduce the temperature increase of components near the brakes, some aircraft manufacturers install an insulation layer between the brakes and the components. However, insulation layers tend to increase the cost of the aircraft and reduce space within the aircraft.

SUMMARY

The subject matter of the present application has been developed in response to the present state of the art, and in particular, in response to the problems and needs of aircraft braking systems that have not yet been fully solved by currently available systems. For example, although some conventional braking systems and techniques attempt to reduce brake heat loads and/or cool brakes using passive or active techniques, such systems and techniques may require expensive and extraneous components and ultimately may fail to meet commercial aviation regulations and/or faster, more frequent flight schedules. Accordingly, the subject matter of the present application has been developed to provide an aircraft landing gear system, which passively cools aircraft brakes during flight and overcomes at least some of the above-discussed shortcomings of prior art aircraft braking systems and techniques.

According to one embodiment, an apparatus for cooling at least one landing gear brake of an aircraft in flight is described. The apparatus includes an air handling assembly that is coupled to the aircraft. The air handling assembly includes at least one air inlet port. The apparatus also includes an air delivery assembly that is in air receiving communication with the air handling assembly. The air delivery assembly includes at least one nozzle that is configured to direct air into a first space adjacent a first side of the landing gear brake to create an air pressure differential across the landing gear brake. In some implementations, the air pressure differential forces air to flow across the landing gear brake.

According to some implementations of the apparatus, the air handling assembly is coupled to an exterior surface of the aircraft. The at least one air inlet port can be in air receiving communication with air external to the aircraft, and the at least one air exhaust port can be in air expelling communication with air external to the aircraft. The air handling assembly includes an elongate body that extends along a length of the aircraft.

In some implementations of the apparatus, the air handling assembly includes a plurality of air inlet ports. The air delivery assembly can include a plurality of nozzles each coupled in air receiving communication to one of a plurality of air delivery passages. Each of the plurality of air delivery passages can be coupled in air receiving communication to one of the plurality of air inlet ports via one of a plurality of air handling passages.

According to certain implementations of the apparatus, the air delivery assembly includes an air manifold and a plurality of nozzles coupled to the air manifold. The plurality of nozzles are spaced circumferentially about the air manifold.

In some implementations of the apparatus, the at least one landing gear brake includes a first landing gear brake and a second landing gear brake. The at least one nozzle includes a first nozzle and a second nozzle. The first nozzle can be configured to direct air into the first space adjacent the first side of the first landing gear brake, and the second nozzle can be configured to direct air into a first space of a first side of the second landing gear brake. The first and second landing gear brakes can be coaxial with each other. The first and second nozzles may be spaced apart from each other, with the first and second landing gear brakes being positioned between the first and second nozzles. The first nozzle can direct air toward the second nozzle and the second nozzle can direct air toward the first nozzle.

According to another embodiment, a landing gear assembly for an aircraft having a landing gear cavity formed in a body of the aircraft is described. The assembly includes a door that is pivotable with respect to the body of the aircraft and a wheel assembly that is positionable within the landing gear cavity. The wheel assembly includes at least one brake. The landing gear assembly also includes an air handling assembly that is coupled to an exterior surface of the door. The air handling assembly includes an air intake. Additionally, the landing gear assembly includes an air delivery assembly in air receiving communication with the air handling assembly. The air delivery assembly includes at least one air passage that extends through the door and a nozzle that is coupled to the at least one air passage. The nozzle is configured to accelerate air toward the at least one brake when the wheel assembly is positioned within the landing gear cavity.

In some implementations of the landing gear assembly, the wheel assembly can include a tire and a hub about which the tire is positioned and within which the at least one brake is positioned. The hub defines a space adjacent a first side of the at least one brake. The accelerated air increases a first pressure of air within the space to a pressure greater than a second pressure of air adjacent a second side of the at least one brake opposite the first side. The air delivery assembly can include a plurality of nozzles coupled to the at least one air passage, and the hub can include a plurality of spoke cavities. At least a portion of the plurality of nozzles may accelerate air through the plurality of spoke cavities.

According to certain implementations of the landing gear assembly, the air delivery assembly includes an air manifold and the at least one nozzle is coupled to the air manifold. The air manifold can be attached to an interior surface of the door. In certain implementations of the landing gear assembly, the air handling assembly can include an exhaust port that extends from an inlet open to the landing gear cavity to an outlet external to the landing gear cavity.

In some implementations of the landing gear assembly, the wheel assembly includes first and second brakes each associated with one of first and second coaxial tires. The air delivery assembly includes a first air passage that extends through the door and a first nozzle that is coupled to the first air passage, and a second air passage that extends through the door and a second nozzle that is coupled to the second air passage. The first nozzle can be configured to accelerate air toward the first brake when the wheel assembly is positioned within the landing gear cavity, and the second nozzle can be configured to accelerate air toward the second brake when the wheel assembly is positioned within the landing gear cavity. The first nozzle can accelerate air in a first direction substantially parallel to the axes of the first and second wheels and the second nozzle can accelerate air in a second direction substantially parallel to the axes of the first and second tires. The first direction is substantially opposite the second direction. The first tire can be positioned nearer the door than and the second tire. Moreover, the first air passage can extend at most a nominal distance into the landing gear cavity, and the second air passage can extend a distance into the landing gear cavity to at least partially wrap about the first and second tires. A first section of the second air passage can be fixed relative to the door, and a second section of the second air passage can be fixed relative to the body of the aircraft. The first and second sections can be rotatable relative to each other.

In one embodiment, the brake cooling system described herein can facilitate the implementation of a method for cooling a landing gear brake of an aircraft in flight. The method includes directing air external to the aircraft to at least one nozzle adjacent the landing gear brake, where the landing gear brake is internal to the aircraft. The method also includes moving the air through the at least one nozzle and into a first space on a first side of the landing gear brake. Additionally, the method includes pressurizing the air in the first space to a first pressure. The first pressure can be greater than a second pressure of air in a second space on a second side of the landing gear opposing the first side of the landing gear. Further, the method includes forcing the air in the first space to flow across the landing gear brake from the first space to the second space via a pressure differential between the air in the first space at the first pressure and the air in the second space at the second pressure.

In some implementations of the method, moving the air through the at least one nozzle includes increasing the velocity of the air. According to yet some implementations, moving the air through the at least one nozzle creates a high velocity air jet. Moving the air into the first space can include impinging the air directly against a surface of the at least one brake.

According to certain implementations, the method may also include directing the air in the second space to a location external to the aircraft. The method may further include creating a low pressure zone within the location external to the aircraft. Air in the low pressure zone is at a third pressure that is less than the second pressure.

In certain implementations, the method includes forcing convective transfer of heat from the at least one brake to the air flowing across the landing gear brake.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
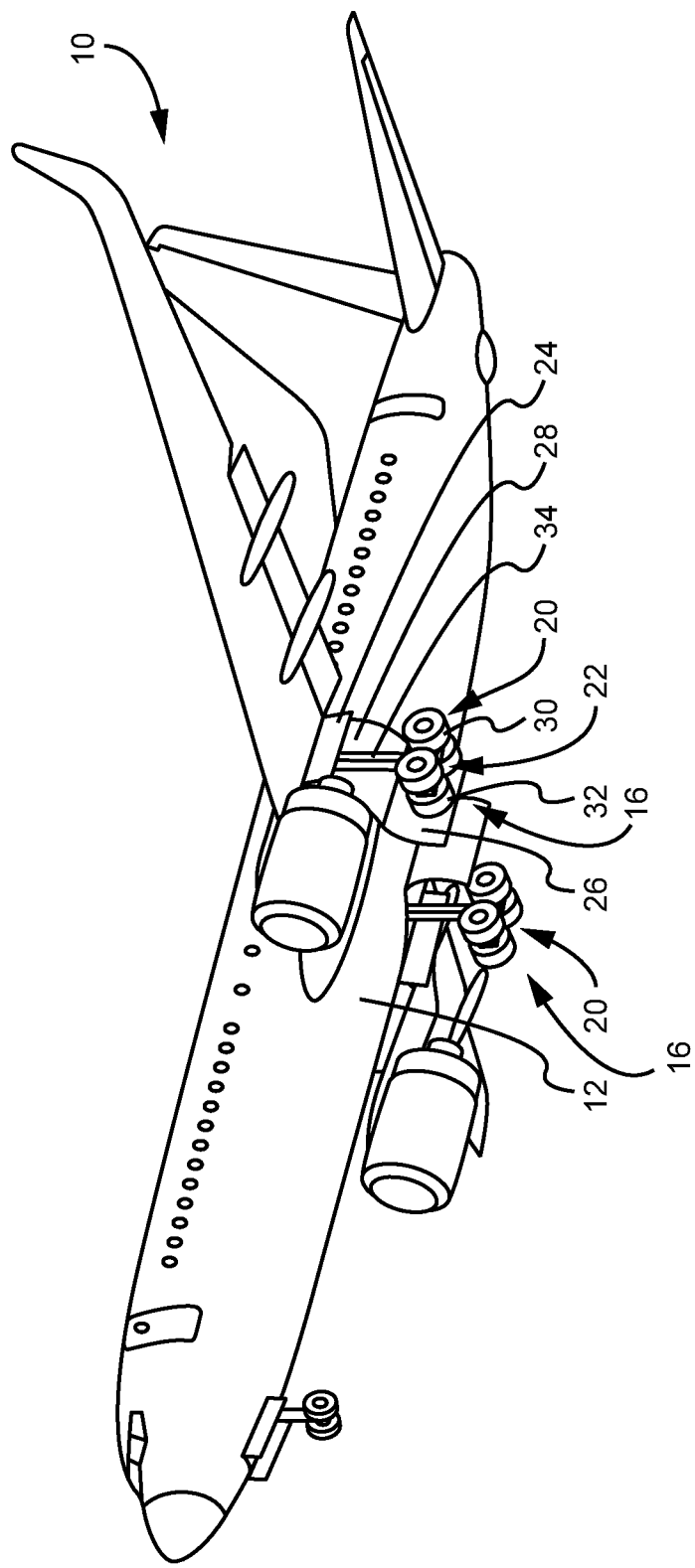
FIG. 1 is an upward perspective view of an aircraft with landing gear in an extended position according to one embodiment.
Figure 6:
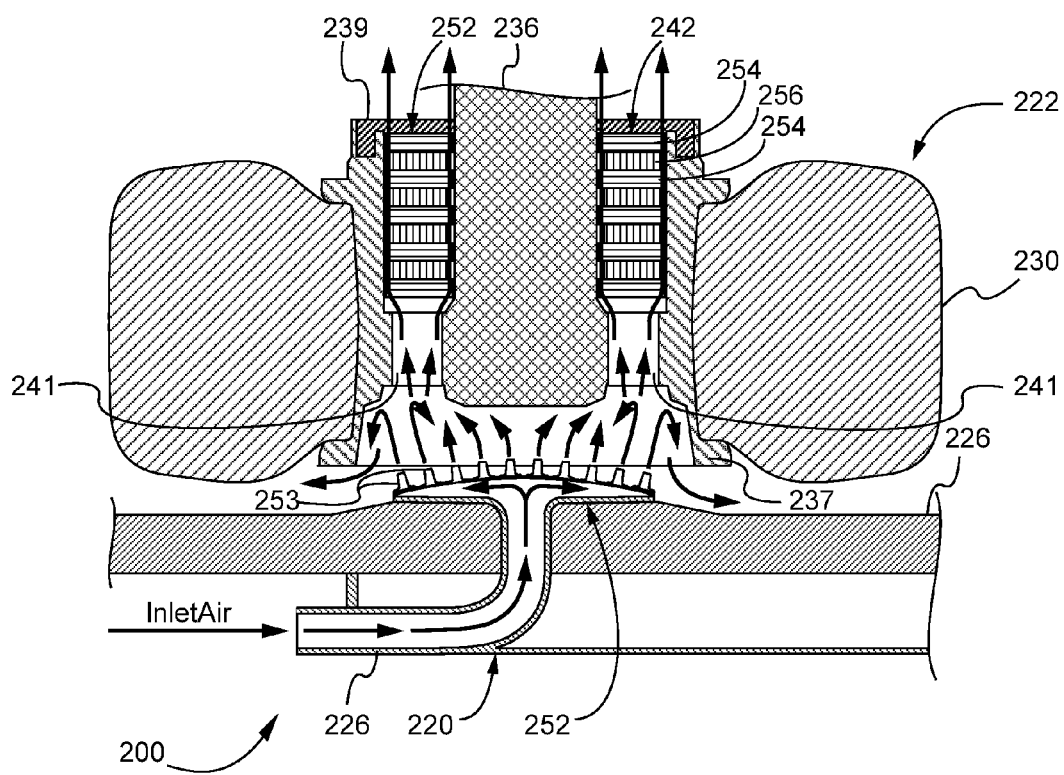
FIG. 6 is a cross-sectional side view of a lower manifold of a brake cooling system and a wheel assembly of landing gear in a retracted or stored position according to one embodiment.

Referring to FIG. 1, one embodiment of an aircraft 10 is shown. The aircraft 10 can be any of various commercial aircraft used for the transportation of passengers. The aircraft 10 includes a body or fuselage 12, and a pair of main landing gear assemblies 16 coupled to the body. Each main landing gear assembly 16 generally includes a main landing gear 20 with a wheel assembly 22 coupled to a support shaft 34. In the illustrated embodiment, the wheel assembly 22 includes two pairs of outer and inner tires 30, 32. The outer and inner tires 30, 32 can be rotatably coupled to an axle 36 (see, e.g., FIG. 2). Each of the outer and inner tires 30, 32 includes a respective brake assembly 40, 50 with an associated brake stack 42, 52. Each brake stack 42, 52 includes at least one rotor component and at least one stator component positioned between the axle and the rim. In some applications, at least one of the rotor components and stator components of a brake stack are positioned fairly tightly against the axle and/or the rim such that a relatively small space exists between the rotor and stator components, and the axle and rim. As shown in FIG. 6, each brake stack 42, 52 may include a plurality of rotor components (e.g., rotor components 254) and a plurality of stator components (e.g., stator components 256). The at least one rotor component is co-rotatably coupled to a corresponding tire via a rim (e.g., rim 237). For example, the at least one rotor may include keyed sections or notches that engaged corresponding elements formed in the rim to prevent relative rotation between the at least one rotor and the rim and tire. In contrast, the at least one stator component remains stationary relative to the rim or tire.

For braking operation, the at least one stator component is actuated, such as via the application of hydraulic pressure, to press against the rotor component, which applies a frictional force against the at least one rotor. The frictional force acts to slow down the rotation of the at least one rotor, and thus the rim and tire. However, the application of the frictional force also places extreme heat loads on the at least one rotor and stator, which dramatically increases the temperatures of the components of the brake stacks. A brake control mechanism 44, which can be any of various types of hydraulic pressure control device known in the art, is shown schematically in FIG. 2.

The support shaft 34 is pivotable to position the landing gear 20, including the wheel assembly 22, between an extended position and a retracted or stored position. As shown in FIG. 1, in the extended position, the support shaft 34 extends downwardly away from the body 12 of the aircraft 10 such that the wheel assembly 22 is positioned below the body. In the extended position, the aircraft 10 can be inflight preparing for landing, supported on the ground by the landing gear 20, or in flight just after takeoff. In contrast, in the retracted position, the support shaft 34 is positioned within the body 12 of the aircraft such that the wheel assembly 22 is positioned within a landing gear cavity or wheel well 28 defined in the body. In the retracted position, the aircraft 10 can be inflight before landing and after takeoff. In the illustrated embodiment, the support shaft 34 rotates between the extended and retracted positions about an axis that is substantially parallel to a length of the body 12. In other embodiments, the support shaft 34 can move between extended and retracted positions according to other methods, such as rotate about an axis that is substantially perpendicular to the length of the body 12.

Figure 2:
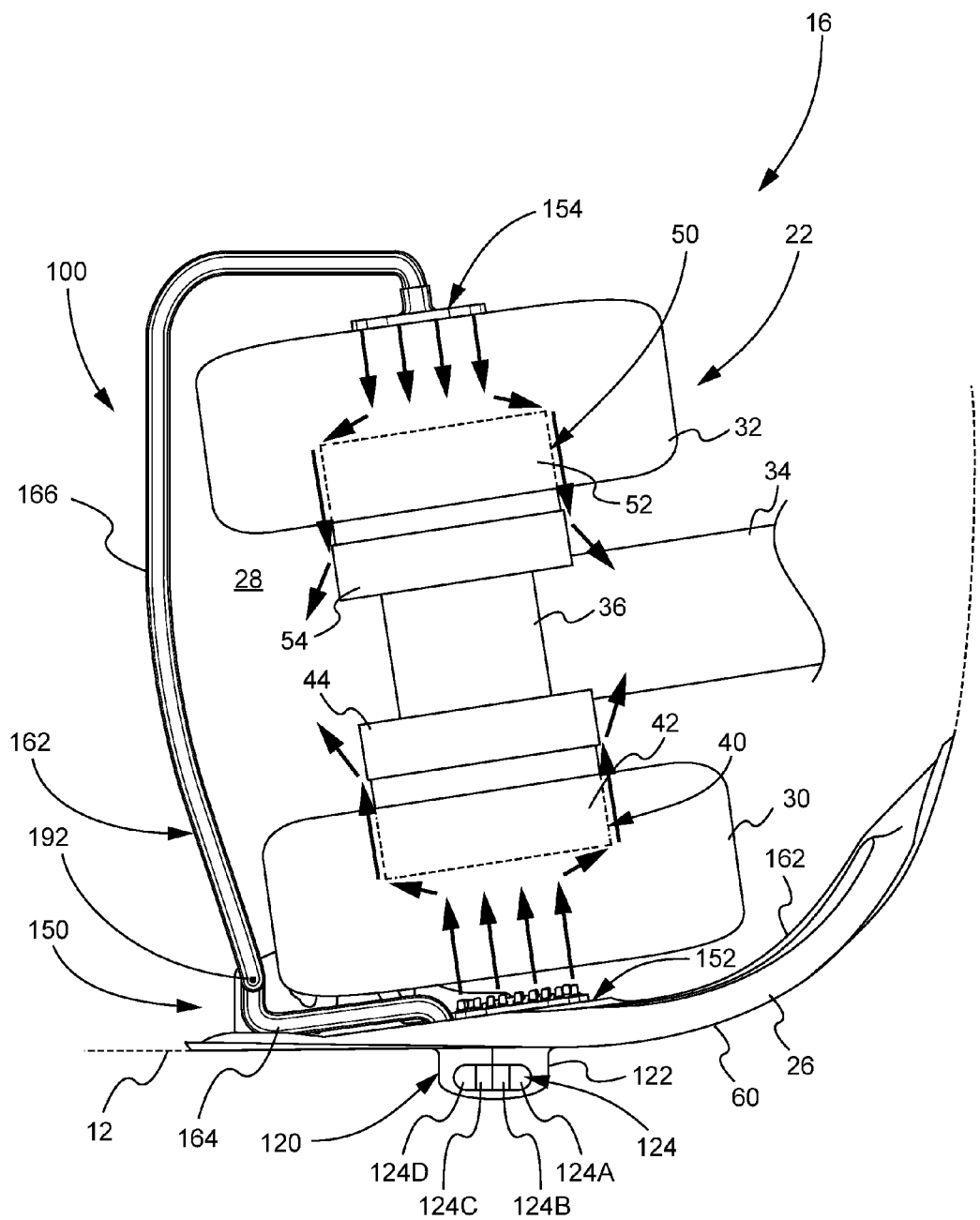
FIG. 2 is a front view of a brake cooling system and landing gear in a retracted or stored position according to one embodiment.

The main landing gear assembly 16 includes an outer door 24 and inner door 26 for each landing gear 20. The outer and inner doors 24, 26 are movable (e.g., pivotable) between open and closed positions. When the landing gear 20 is in the extended position, the outer and inner doors 24, 26 are in an open position, and when the landing gear 20 is in the retracted position, the outer and inner doors 24, 26 can be in the closed position. In the open position, the outer and inner doors 24, 26 are positioned away from the body to allow access to the landing gear cavity 28. In the closed position, the outer and inner doors 24, 26 are positioned over the landing gear cavity 28 to prevent access to the landing gear and effectively cover the landing gear cavity 28. Referring to FIG. 2, for enhanced aerodynamics, in some implementations, when in the closed position, the outer and inner doors 24, 26 are flush with the body 12. In yet some implementations, the outer and inner doors 24, 26 are sealed against the body 12 when in the closed position. Although the doors 24, 26 are outer and inner doors, in some embodiments, the doors can be forward and rearward doors, or the body 12 have a single door covering the landing gear cavity.

In the illustrated embodiment, the inner door 26 covering the landing gear cavity 28 includes an exterior surface 60 facing outwardly away from the body 12 and an interior surface 62 facing inwardly toward the landing gear cavity when the door is in the closed position. The exterior and interior surfaces 60, 62 of the inner door 26 are spaced apart by a thickness of the inner door, which may be solid, hollow, or both. As shown in FIG. 2, in the retracted position, the outer tire 30 of the wheel assembly 22 is positioned lower than the inner tire 32 of the wheel assembly. Accordingly, when retracted, the outer tire 30 can be defined as a lower tire and the inner tire 32 can be defined as an upper tire.

Referring to FIGS. 2-6, each main landing gear assembly 16 includes a brake cooling system 100. The brake cooling system 100 includes an air handling assembly 120 and an air delivery assembly 150. Generally, the air handling assembly 120 captures ambient air from outside the aircraft 10 and distributes the captured air to the air delivery assembly 150. In turn, the air delivery assembly 150 directs the captured air at the brake stacks 42, 52 to create a pressure differential across the brake stacks, which induces a flow (e.g., represented by directional arrows in FIG. 2) across the brake stacks to force convective cooling of the brake stacks.

Figure 4:
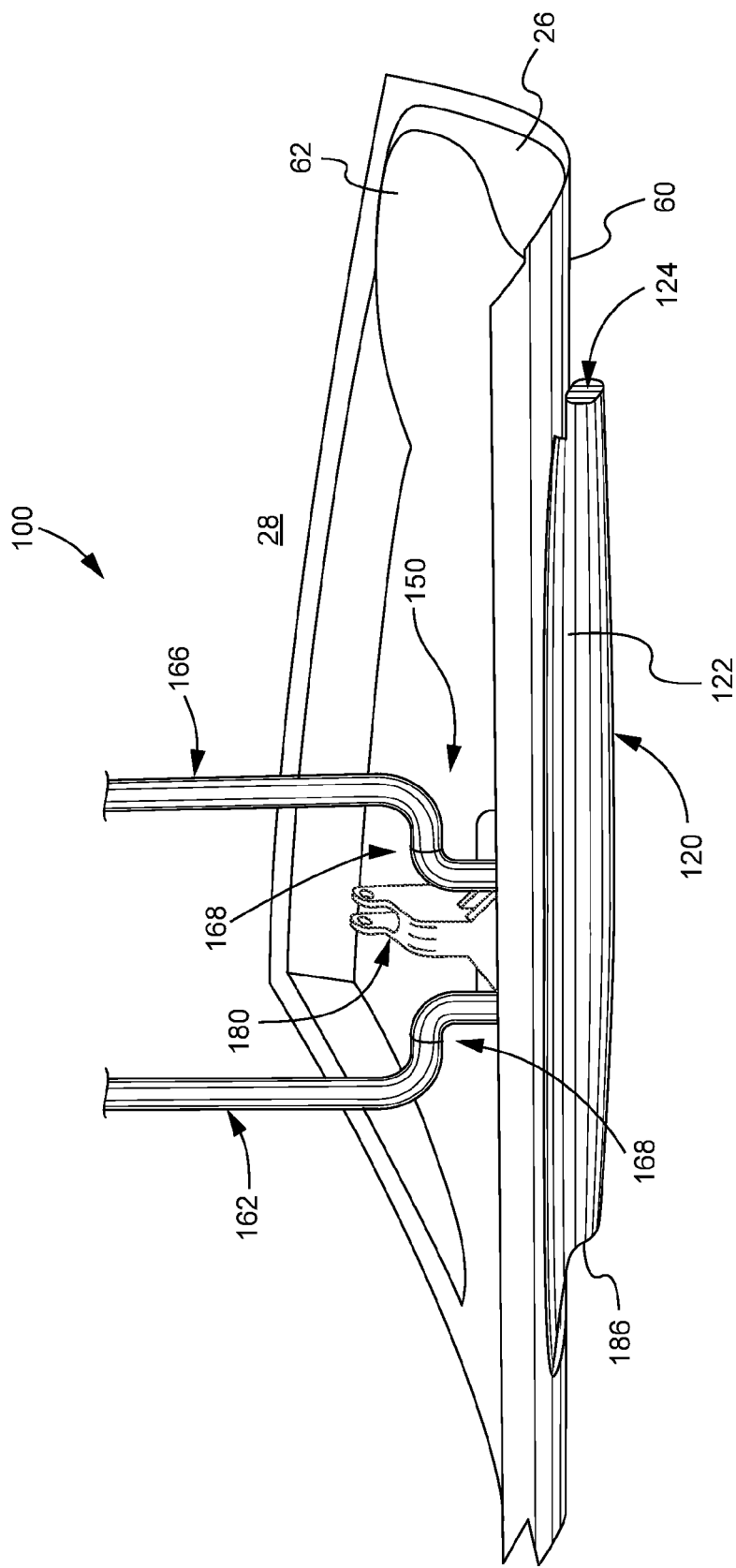
FIG. 4 is a sideward perspective view of an air handling assembly coupled to a landing gear inner door in a closed position according to one embodiment.

The air handling assembly 120 includes a body 122 coupled to the exterior surface 60 of the inner door 26. As shown in FIG. 4, the body 122 is elongate in a longitudinal direction parallel to the central axis of the body 12 of the aircraft 10. The body 122 can be substantially hollow to define an interior cavity 128 between the body 122 and the exterior surface 60 of the inner door 26. The body 122, being exposed to air external to the aircraft 10, can be aerodynamically shaped to reduce drag. Moreover, the body 122 includes a front section with diverging sidewalls in a front-to-back direction and a back section with converging sidewalls in a front-to-back direction. In other words, a width of the body 122 is largest at a middle section, which aids in creating a low pressure zone just downstream of a back end of the body of the air handling assembly during flight. Although the body 122 is shown coupled to the inner door 26 in the illustrated, which provides some benefits over other locations in certain applications, in some embodiments, the body 122 (and more specifically, the air intake of the body) may be coupled to any portion of the aircraft as desired.

The body 122 of the air handling assembly 120 includes an air intake 124 positioned at a front end of the body. The air intake 124 includes a plurality of inlet ports for segregating external air captured by the air intake into separate air flows. In the illustrated embodiment, the air intake 124 includes four intake ports for segregating the captured air into four separate air flows. More specifically, the air intake 124 includes first, second, third, and fourth air inlet ports 124A-124D that segregate captured air from the exterior of the aircraft 10 into lower nozzle air flow 130 and upper nozzle air flow 132, respectively. Although four air inlet ports are shown, in other embodiments, the air intake can include fewer or more than four air inlet ports. Each of the first, second, third, and fourth air inlet ports 124A-124D is fluidly coupled to a corresponding first, second, third, and fourth air handling passage 126A-126D of the air handling assembly 120 positioned within the interior cavity 128 of the body 122 (see, e.g., FIG. 5). The air inlet ports can be fluidly coupled to the air handling passages in any of various ways, such as providing a fluidly sealed connection between the ports and passages. The air handling passages can be piping, conduits, or other components capable of retaining and directing air flow. Further, the air handling passages 126A-126D extend various distances along a longitudinal length of the body 122 depending on the configuration of the air delivery assembly 150. Moreover, for applications where the body 122 is located on the aircraft 10 away from inner door 26, the air handling passages 126A-126D may have any of various lengths and configurations to accommodate the position of the body and transfer air to the air delivery assembly 150 as will be described below.

Figure 3:
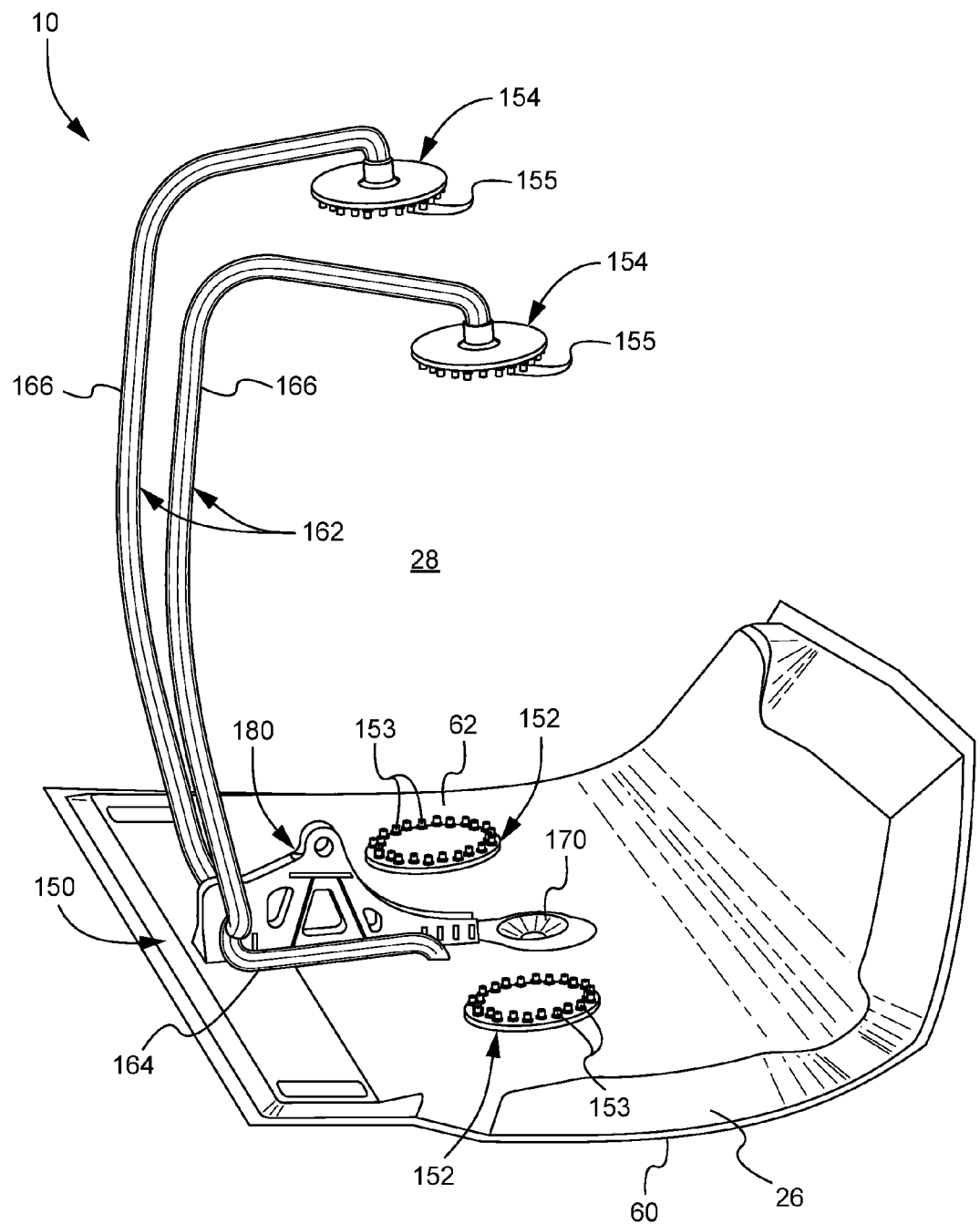
FIG. 3 is a downward perspective view of a brake cooling system with a landing gear inner door in a closed position according to one embodiment.

The air delivery assembly 150 includes at least one lower manifold or plenum 152, and at least one upper manifold or plenum 154. As shown in FIG. 3, the lower manifold 152 includes at least one nozzle or jet 153, and the upper manifold 154 includes at least one nozzle or jet 155. In the illustrated embodiment, the lower and upper manifolds 152, 154 are substantially disk-shaped with a hollow interior (see, e.g., FIG. 6). The hollow interiors of the lower and upper manifolds 152, 154 are fluidly coupled with the respective nozzles 153, 155. As shown, the lower and upper manifolds 152, 154 each may have a circular-shaped outer surface with a plurality of nozzles 153, 155, respectively, spaced circumferentially about the outer surface. In some implementations, the plurality of nozzles 153, 155 are positioned at radially outward extents (e.g., about an outer periphery) of the circular-shaped outer surfaces of the lower and upper manifolds 152, 154.

Each nozzle 153, 155 defines a fluid conduit extending approximately perpendicular with respect to the outer surfaces of the manifolds. The fluid conduits of the nozzles 153, 155 each have a cross-sectional area that is smaller than the hollow interior of the corresponding lower and upper manifolds 152, 154, and the combined cross-sectional areas of the nozzles 153, 155 are smaller than the cross-sectional area of the corresponding manifolds. In this manner, with a continuous supply of air into the lower and upper manifolds 152, 154, the pressure of air in the hollow interior forces and accelerates air through the fluid conduits of the nozzles 153, 155. The accelerated air streams exit the nozzles 153, 155 in a direction substantially parallel to the fluid conduits, which in the illustrated embodiments is a direction substantially perpendicular to the outer surface of the respective manifolds 152, 154 (see, e.g., directional arrows in FIG. 2).

The lower manifold 152 of the air delivery assembly 150 is strategically positioned adjacently below the lower tire 30 and associated brake stack 42 when the landing gear 20 is in the closed position and the inner door 26 is closed. For example, a central axis of the lower manifold 152 may be aligned with a central axis of the upper tire 30. In this manner, the accelerated air streams from the nozzles 153 are directed towards the brake stack 42. Because the brake stack 42 is fitted relatively tightly within the rim of the lower tire 30, the accelerated air streams induce a build-up of pressure in a lower space within the rim adjacent the brake stack and between the brake stack and the lower manifold 152. The continuous flow of accelerated air into the lower space effectively maintains the pressurization of the lower space. An upper space on an opposite side of the brake stack 42 as the lower space is not constrained in the same manner as the lower space, and is not pressurized like the lower space. Accordingly, the pressure of air in the upper space is lower than the pressure of air in the lower space. This pressure differential induces a flow of air from the lower space through the tight spaces between the brake stack and the rim, and across the brake stack 42. The pressure-induced flow across the brake stack 42 forces convective heat transfer from the components (e.g., rotors and stators) of the brake stack 42 to the flow. The pressure-induced flow then transports the heat from the brake stack 42 to the upper space where it is dispersed into the landing gear cavity 28 of the landing gear assembly 22. In this manner, the brake cooling system 100 facilitates forced convective cooling of the brake stack 42, which results in a relatively rapid reduction of the temperature of the brake stack 42 during flight.

Generally, with the landing gear 20 in the closed position and the inner door 26 being closed, the lower tire 30 is positioned relatively close to the interior surface 62 of the inner door 26. Such a configuration conserves space within the landing gear cavity 28 and facilitates the use of a smaller landing gear cavity 28, which ultimately conserves space within the aircraft 10. In such configurations, the lower manifold 152 is positioned between the lower tire 30 and the interior surface 62 of the inner door 26, and in some instances, may be positioned in close proximity to the interior surface. According to some implementations, in order to strategically position the lower manifold 152 adjacent the brake stack 42 as described above, the lower manifold 152 is coupled to the interior surface 62 or formed in the inner door 26.

Figure 5:
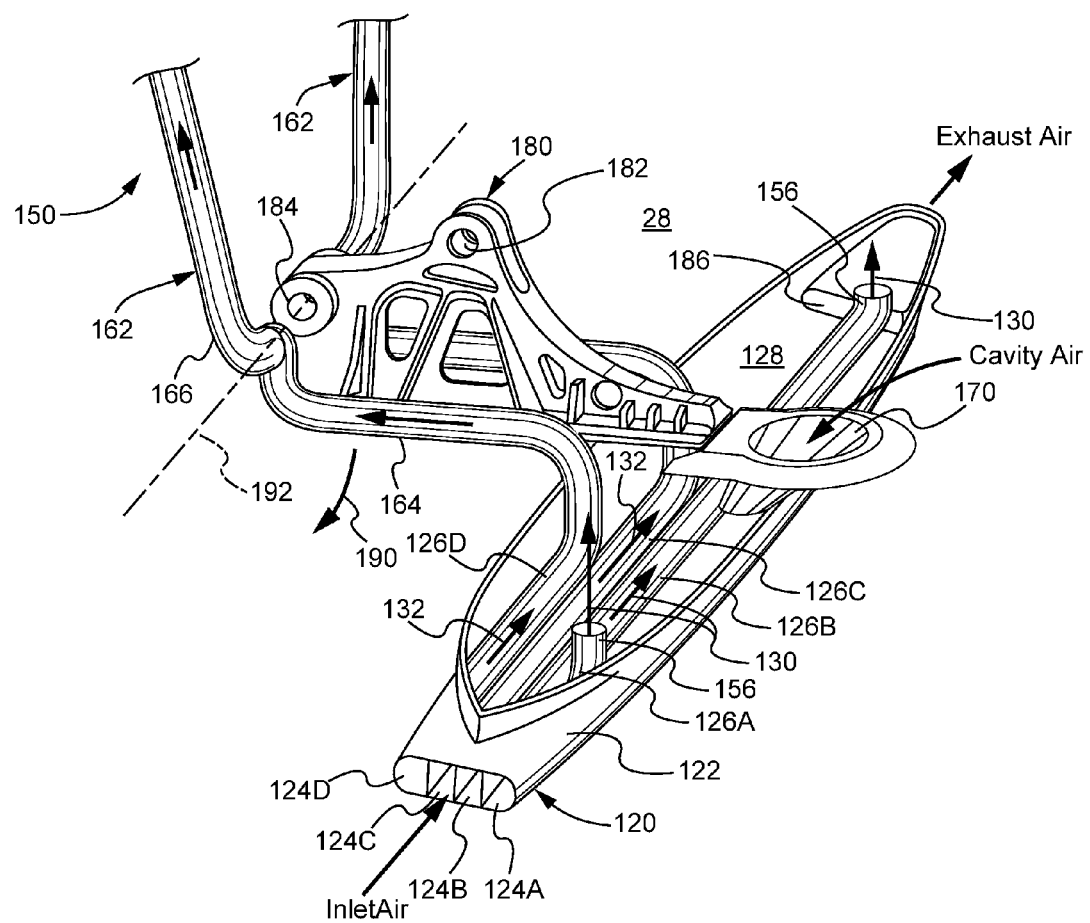
FIG. 5 is a downward perspective view of a brake cooling system and an air handling assembly shown with a landing gear inner door removed for clarity according to one embodiment.

The lower manifold 152 receives air from a lower air delivery passage 156 of the air delivery assembly 150 (see, e.g., FIG. 5). The lower air delivery passage 156 is fluidly coupled to an air handling passage of the air handling assembly 120. For example, in the illustrated embodiment, the lower air delivery passage 156 receives air from one of the first and second air handling passages 126A, 126B. In this manner, the lower manifold 152 receives ambient air external to the aircraft 10 via the air intake 124, an air inlet port, and an air handling passage of the air handling assembly 120, as well as a lower air delivery passage 156 of the air delivery assembly. As mentioned, the lower air delivery passage 156 fluidly couples the lower manifold 152 and an air handling passage. Therefore, the lower air delivery passage 156 is sized and shaped to retain and direct fluid (e.g., piping, conduit, and the like), as well as be positioned between the lower manifold 152 and the corresponding one of the air handling passages 126A, 126B. In the illustrated embodiment, with the lower manifold 152 being closely coupled to the exterior surface 60 of the inner door 26 and near the corresponding air handling passage 126A or 126B, the lower air delivery passage 156 is relatively short and extends through the inner door 26. In some embodiments, the lower air delivery passage 156 and the corresponding air handling passage 126A or 126B form a single, continuous, monolithic length of piping such that the lower air delivery passage and the corresponding air handling passage are effectively two sections of the same piping. However, in other embodiments, the lower air delivery passage 156 and the corresponding air handling passage 126A or 126B are separately formed pipes and connected during assembly.

Similar to the lower manifold 152, the upper manifold 154 of the air delivery assembly 150 is strategically positioned adjacent the upper tire 32 and associated brake stack 52 when the landing gear 20 is in the closed position and the inner door 26 is closed. For example, a central axis of the upper manifold 154 may be aligned with a central axis of the upper tire 32. In this manner, the accelerated air streams from the nozzles 155 are directed towards the brake stack 52. Because the brake assembly 50 and upper tire 32 are configured similarly to the brake assembly 40 and lower tire 30, forced convective cooling of the brake stack 52 resulting in a relatively rapid reduction of the temperature of the brake stack 52 during flight is achieved in the same manner.

However, because the upper tire 32 and brake stack 52 have a mirrored orientation with respect to the lower tire 30 and brake stack 42, the accelerated air streams from the nozzles 155 are directed towards and in opposite directions as the accelerated air streams from the nozzles 153. Further, the mirrored configuration of the wheel assembly 22 requires the upper manifold 154 to be spaced apart from the lower manifold 152 a distance larger than a tire-to-tire distance in an axial direction of the lower and upper tires 30, 32.

Again, similar to the lower manifold 152, the upper manifold 154 receives air from an upper air delivery passage 162 of the air delivery assembly 150 (see, e.g., FIGS. 2-5). For example, the upper air delivery passage 162 is fluidly coupled to an air handling passage of the air handling assembly 120. In the illustrated embodiment, the upper air delivery passage 162 receives air from one of the third and fourth air handling passages 126C, 126D. In this manner, the upper manifold 154 receives ambient air external to the aircraft 10 via the air intake 124, an air inlet port, and an air handling passage of the air handling assembly 120, as well as an upper air delivery passage 162 of the air delivery assembly. As mentioned, the upper air delivery passage 162 fluidly couples the upper manifold 154 and an air handling passage. Therefore, the upper air delivery passage 162 is sized and shaped to retain and direct fluid (e.g., piping, conduit, and the like), as well as be positioned between the upper manifold 154 and the corresponding one of the air handling passages 126C, 126D. In the illustrated embodiment, with the upper manifold 154 being spaced apart, and relatively remote, from the exterior surface 60 of the inner door 26 and the corresponding air handling passage 126C or 126D, the upper air delivery passage 162 is comparatively longer than the lower air delivery passage 156. Moreover the upper air delivery passage 162 extends through the inner door 26, along the exterior surface 60 of the inner door, and upwardly into the landing gear cavity 28 around the wheel assembly 22.

According to the illustrated embodiment of the landing gear 20, the wheel assembly 22 rotates or swings into the opened landing gear cavity 28 from below while or after the inner door 26 is rotated downwardly in a direction indicated by directional arrow 190 to place the inner door in an open position. Because the wheel assembly 22 approaches the landing gear cavity 28 from below, the upper manifold 154 positioned above the upper tire 32 when stored can remain stationary relative to the body 12 of the aircraft without impeding the motion of the wheel assembly. However, because the lower manifold 152 and a portion of the upper air delivery passage 162 are positioned below the lower tire 30 when stored, the lower manifold and portion of the upper air delivery passage must be moved (e.g., rotated), along with the inner door 26, to allow the wheel assembly 22 to be moved into the landing gear cavity 28 from below.

To facilitate rotation of the portion of the upper air delivery passage 162 under the wheel assembly 22 relative to the remaining portion of the upper air delivery passage, the upper air delivery passage includes a first section 164 fixed relative to the inner door 26 and a second section 166 fixed relative to the body 12 of the aircraft 10. The first and second sections 164, 166 of the upper air delivery passage 162 are rotatably coupled to each other by a coupling 168. The coupling 168 facilitates fluidly sealed and rotatable engagement between the first and second sections 164, 166 of the upper air delivery passage 162. The coupling 168 allows the first section 164 to rotate relative to the second section 166 about an inner door axis of rotation or hinge line 192. Accordingly, as the inner door 26 rotates relative to the body 12 about the inner door axis of rotation 192, the first section 164 rotates relative to the second section 166 about the inner door axis of rotation. The coupling 168 may include positioning one end of the first or second section 164, 166 within an opposing end of the other of the first or second section, and providing a sealing mechanism (e.g., o-ring) to seal the first and second sections together while allowing relative movement between the first and second sections. To stabilize the second section 166 of the upper air delivery passage 162 and the upper manifold 154, a bracket or other mount (not shown) can be used to couple the second section to a portion of the body 12 of the aircraft 10.

In some embodiments, the first section 164 of the upper air delivery passage 162 and the corresponding air handling passage 126C or 126D form a single, continuous, monolithic length of piping such that the lower air delivery passage and the corresponding air handling passage are effectively two sections of the same piping. However, in other embodiments, the first section 164 and the corresponding air handling passage 126C or 126D are separately formed pipes and connected during assembly.

The landing gear assembly 16 includes a hinge mount 180 coupled to the interior surface 62 of the inner door 26. The hinge mount 180 includes actuator pivot apertures 182 and a body pivot aperture 184. The actuator pivot apertures 182 are coupled to an inner door actuator (not shown) configured to actuate to open and close the inner door 26. The body pivot aperture 184 is coaxial with the inner door axis of rotation 192 and can be rotatably coupled via a pin to a corresponding hinge mount (not shown) secured to the body 12.

The foregoing describes the brake cooling system 100 being applied to a single pair of lower and upper (outer and inner) tires 30, 32. However, the brake cooling system 100 in the illustrated embodiments shown in FIGS. 3-5 is configured for application to a wheel assembly 22 with two pairs of lower and upper tires (see, e.g., the wheel assembly 22 of FIG. 1). For example, the air delivery assembly 150 includes two lower manifolds 152 and two upper manifolds 154. The lower manifolds 152 are spaced apart in a front-to-back direction to align with respective spaced apart lower tires 30 of a wheel assembly 22 with two sets of tires. Similarly, the upper manifolds 154 are spaced apart in a front-to-back direction to align with respective spaced apart upper tires 32 of a wheel assembly 22 with two sets of tires. The two lower air delivery passages 156 feeding air to the respective two lower manifolds 152 are fluidly coupled to one of the first and second air inlet ports 124A, 124B and the corresponding one of the first and second air handling passages 126A, 126B. Similarly, the two upper air delivery passages 162 feeding air to the respective two upper manifolds 154 are fluidly coupled to one of the third and fourth air inlet ports 124C, 124D and the corresponding one of the third and fourth air handling passages 126C, 126D. Based on the above principles, the brake cooling system 100 can be modified to add additional air inlet ports, air handling passages, air delivery passages, and upper and lower manifolds to accommodate any number of pairs of lower and upper tires.

As shown in FIGS. 3-5, the brake cooling system 100 includes an air exhaust port 170 open to the landing gear cavity 28 on one end and open to the interior cavity 128 of the air handling assembly body 122. As such, the air handling assembly includes the exhaust port 170 extending from an inlet open to the landing gear cavity 28 to an outlet 186 external to the landing gear cavity 28. The air exhaust port 170 facilitates the transfer of air from within the landing gear cavity 28 to the interior cavity 128 of the body 122. As shown, the air exhaust port 170 is integrated into and passes through the inner door 26. The brake cooling mechanism 100 also includes the air exhaust outlet 186 formed in the body 122 of the air handling assembly 120. The air exhaust outlet 186 facilitates the transfer of air from within the interior cavity 128 of the body 122 to the environment external to the body 12 of the aircraft 10. The flow of air from within the landing gear cavity 28, through the air exhaust port 170, through the interior cavity 128 of the body 122, and out through the air exhaust outlet 186 is facilitated by the low pressure zone downstream of the back end of the body during flight. The low pressure zone creates a pressure differential between the air in the landing gear cavity at a relatively higher pressure and the low pressure zone at a relatively lower pressure. In this manner, the air captured by the air handling assembly 120 and delivered to the brake stacks by the air delivery assembly 150 is expunged from the landing gear assembly 16. In addition to the diverging and converging of the sidewalls of the body 12, a back end of the body 122 proximate the air exhaust outlet 186 is truncated to enhance the low pressure zone downstream of the back end.

As shown schematically in FIG. 6, another embodiment of a brake cooling system 200 includes features similar to the features of the brake cooling system 100, with like numbers referring to like features. The brake cooling system 200 is configured to passively cool the brake stack 242, which has a plurality of rotor components 254 between a plurality of stator components 256, by forced convection. The brake stack 242 forms part of a wheel assembly 222 that is stored within a landing gear cavity 228 when a landing gear door 226 is closed as shown. Closely coupled to the landing gear door 226 is an air handling assembly 220. The air handling assembly 220 captures air external to the landing gear cavity 228 and delivers the air to a lower manifold 252 with a plurality of nozzles 253. The air is accelerated as it passes through the plurality of nozzles 253 to form a plurality of jet streams directed toward the wheel assembly 222 as shown by the plurality of directional arrows. The plurality of high-velocity jet streams enter a space defined by a rim 237 that supports a lower tire 230 on an axle 236. The components of the brake stack 242 are positioned within the rim 237, and at least partially secured in place by a partially open brake retention plate 239.

A portion of the high-velocity jet streams pass into spoke cavities 241 defined by the rim 237. The spoke cavities 241 are apertures open to the space defined by the rim 237 on one side and the brake stack 242 on the other side. Because the rotational position of the rim 237 is not fixed and the number, size, and shape of the spoke cavities may vary from aircraft to aircraft, the exact placement of the spoke cavities 241 upon storage of the wheel assembly 222 is not known. Accordingly, in some implementations, the number and spatial configuration of the nozzles 253 on the lower manifold 252 is such that at least some threshold number (e.g., two) of nozzles 253 direct high-velocity jet streams toward and into each spoke cavity 241 for a known spoke cavity configuration. According to one implementation, a high-velocity jet stream or high-velocity air jet is a jet stream or air jet moving at a high velocity or high mass flow rate, which can be defined as a velocity or mass flow rate that is high enough to generate positive increases in the convective flow coefficients through the wheel and across the brake stacks.

The portion of the high-velocity jet streams entering the spoke cavities 241 impinge against the brake stack 242, which restricts flow. The impingement forces at least some of the air in the space defined by the rim 237 to exit the space below the tire 230 as shown. However, the impingement also acts to pressurize the air in the spoke cavities 241. Moreover, the pressure within the spoke cavities 241 is maintained by the continuous introduction of new high-velocity jet streams through the nozzles 253. The pressurization of the spoke cavities 241 induces a pressure gradient across the brake stack 242 because the pressure of air within the landing gear cavity 228 is less than the pressure of air within the spoke cavities. The pressure gradient forces air to flow through openings, spaces, and clearances between the rotor components 254, stator components 256, axle 236, and rim 237, and across the rotor components and stator components. The passively forced flow across the components of the brake stack 242 induces forced convection of heat from the components to the flow. As discussed above, forced convection improves and quickens the heat transfer away from the brake stack 242, such that the temperature of the brake stack decreases at a relatively faster rate compared to natural convection. After passing across the brake stack 242, the heated air is introduced into the landing gear cavity 228 where it is combined with the air forced around the tire 230. Ultimately, the air within the landing gear cavity 228 is expelled from the cavity to the atmosphere via an air exhaust system, such as one according to the description above associated with the brake cooling system 100.

Relatively rapid reduction of the temperature of the brake stack during flight of the brake cooling systems 100, 200 disclosed herein lowers the baseline temperature of the respective brake assembly at which initiation of the brakes during a braking operation upon landing occurs. Because the baseline temperature is relatively low, the maximum temperature of the brake assembly reached while slowing the associated aircraft down during landing is reduced. Accordingly, not only are repetitive-short flight regulations met with smaller capacity brake assemblies and with less use of thrust reversing, but gate departure regulations are met quicker, which facilitates faster gate turnaround times and more frequent flights. Additionally, the lower maximum temperatures and faster cooling rate provided by the brake cooling system of the present application also lowers the risk of heat damage to aircraft components and fire may render insulation unnecessary or reduce the amount of insulation.

Although the brake cooling systems of the present application have been described up to this point as being associated with main landing gear assemblies, the features and advantages of the described brake cooling systems are equally applicable to front landing gear assemblies.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A passive brake cooling system for cooling at least one landing gear brake stack of an aircraft in flight, the passive brake cooling system comprising:
    an air handling assembly coupled to the aircraft, the air handling assembly comprising at least one air inlet port in air receiving communication with a non-compressed air source; and
    an air delivery assembly in air receiving communication with the air handling assembly to receive non-compressed air from the air handling assembly, the air delivery assembly comprising at least one nozzle configured to direct air exiting from the at least one nozzle toward the at least one landing brake stack and into a first space adjacent a first side of the at least one landing gear brake stack to create an air pressure differential across the at least one landing gear brake stack.

2. The brake cooling system of claim 1, wherein the air pressure differential forces air to flow across the at least one landing gear brake stack.

3. The brake cooling system of claim 1, wherein the air handling assembly is coupled to an exterior surface of the aircraft, the at least one air inlet port being in air receiving communication with air external to the aircraft, the apparatus further comprising at least one air exhaust port being in air expelling communication with air external to the aircraft.

4. The brake cooling system of claim 1, wherein the air handling assembly comprises an elongate body extending along a length of the aircraft.

5. The brake cooling system of claim 1, wherein the air handling assembly comprises a plurality of air inlet ports.

6. The brake cooling system of claim 5, wherein the air delivery assembly comprises a plurality of nozzles each coupled in air receiving communication to one of a plurality of air delivery passages, and wherein each of the plurality of air delivery passages is coupled in air receiving communication to one of the plurality of air inlet ports via one of a plurality of air handling passages.

7. The brake cooling system of claim 1, wherein the air delivery assembly comprises an air manifold and a plurality of nozzles coupled to the air manifold.

8. The brake cooling system of claim 7, wherein the plurality of nozzles are spaced circumferentially about the air manifold.

9. The brake cooling system of claim 1, wherein the at least one landing gear brake stack comprises a first landing gear brake stack and a second landing gear brake stack, and wherein the at least one nozzle comprises a first nozzle and a second nozzle, the first nozzle configured to direct air into the first space adjacent the first side of the first landing gear brake stack, and the second nozzle configured to direct air into a first space of a first side of the second landing gear brake stack, the first and second landing gear brake stacks being coaxial with each other.

10. The brake cooling system of claim 9, wherein the first and second nozzles are spaced apart from each other, the first and second landing gear brake stacks being positioned between the first and second nozzles, and wherein the first nozzle directs air toward the second nozzle and the second nozzle directs air toward the first nozzle.

11. A method for passively cooling a landing gear brake stack of an aircraft in flight, the method comprising:
    directing non-compressed air external to the aircraft to at least one nozzle adjacent the landing gear brake stack, the landing gear brake stack being internal to the aircraft;
    moving the non-compressed air through the at least one nozzle toward the landing gear brake stack by directing the air exiting from the at least one nozzle into a first space on a first side of the landing gear brake stack;
    pressurizing the non-compressed air in the first space to a first pressure, the first pressure being greater than a second pressure of air in a second space on a second side of the landing gear brake stack opposing the first side of the landing gear brake stack; and
    forcing pressurized air in the first space to flow across the landing gear brake stack from the first space to the second space via a pressure differential between the pressurized air in the first space at the first pressure and the air in the second space at the second pressure.

12. The method of claim 11, wherein moving the air through the at least one nozzle comprises increasing a velocity of the air.

13. The method of claim 11, wherein moving the air through the at least one nozzle creates a high velocity air jet.

14. The method of claim 11, wherein moving the air into the first space comprises impinging the air directly against a surface of the landing gear brake stack.

15. The method of claim 11, further comprising directing the air in the second space to a location external to the aircraft.

16. The method of claim 15, further comprising creating a low pressure zone within the location external to the aircraft, wherein air in the low pressure zone is at a third pressure that is less than the second pressure.

17. The method of claim 11, further comprising forcing convective transfer of heat from the landing gear brake stack to the air flowing across the landing gear brake stack.

18. A landing gear assembly for an aircraft having a landing gear cavity formed in a body of the aircraft, the landing gear assembly comprising:
    a door pivotable with respect to the body of the aircraft;
    a wheel assembly positionable within the landing gear cavity, the wheel assembly comprising at least one brake stack;
    an air handling assembly coupled to an exterior surface of the door, the air handling assembly comprising an air intake in air receiving communication with a non-compressed air source; and
    an air delivery assembly in air receiving communication with the air handling assembly to receive non-compressed air from the air handling assembly, the air delivery assembly comprising at least one air passage extending through the door and a nozzle coupled to the at least one air passage, wherein the nozzle is configured to accelerate the non-compressed air exiting from the nozzle toward the at least one brake stack when the wheel assembly is positioned within the landing gear cavity.

19. The landing gear assembly of claim 18, wherein the wheel assembly comprises a tire and a rim about which the tire is positioned and within which the at least one brake stack is positioned, and wherein the rim defines a space adjacent a first side of the at least one brake stack, the accelerated air increasing a first pressure of air within the space to a pressure greater than a second pressure of air adjacent a second side of the at least one brake stack opposite the first side.

20. The landing gear assembly of claim 19, wherein the air delivery assembly comprises a plurality of nozzles coupled to the at least one air passage, and the rim comprises a plurality of spoke cavities, wherein at least a portion of the plurality of nozzles accelerate air through the plurality of spoke cavities.

21. The landing gear assembly of claim 18, wherein the air delivery assembly comprises an air manifold, the nozzle being coupled to the air manifold, and wherein the air manifold is attached to an interior surface of the door.

22. The landing gear assembly of claim 18, wherein the wheel assembly comprises first and second brake stacks each associated with one of first and second coaxial tires, and wherein the air delivery assembly comprises a first air passage extending through the door and a first nozzle coupled to the first air passage, and a second air passage extending through the door and a second nozzle coupled to the second air passage, the first nozzle is configured to accelerate air toward the first brake stack when the wheel assembly is positioned within the landing gear cavity, and the second nozzle is configured to accelerate air toward the second brake stack when the wheel assembly is positioned within the landing gear cavity.

23. The landing gear assembly of claim 22, wherein the first nozzle accelerates air in a first direction substantially parallel to axes of the first and second tires and the second nozzle accelerates air in a second direction substantially parallel to the axes of the first and second tires, and wherein the first direction is substantially opposite the second direction.

24. The landing gear assembly of claim 22, wherein the first tire is positioned nearer the door than the second tire, and wherein the first air passage extends at most a nominal distance into the landing gear cavity, and the second air passage extends a distance into the landing gear cavity to at least partially wrap about the first and second tires.

25. The landing gear assembly of claim 24, wherein a first section of the second air passage is fixed relative to the door, and a second section of the second air passage is fixed relative to the body of the aircraft, the first and second sections being rotatable relative to each other.

26. The landing gear assembly of claim 18, wherein the air handling assembly comprises an exhaust port extending from an inlet open to the landing gear cavity to an outlet external to the landing gear cavity.

* * * * *